April 6, 1943.　　F. E. HILL ET AL　　2,315,958

CONTROL SYSTEM

Filed Dec. 22, 1941　　2 Sheets-Sheet 1

Inventors
Frank E. Hill &
Francis G. da Roza

By Blackmore, Spencer & Clark
Attorneys

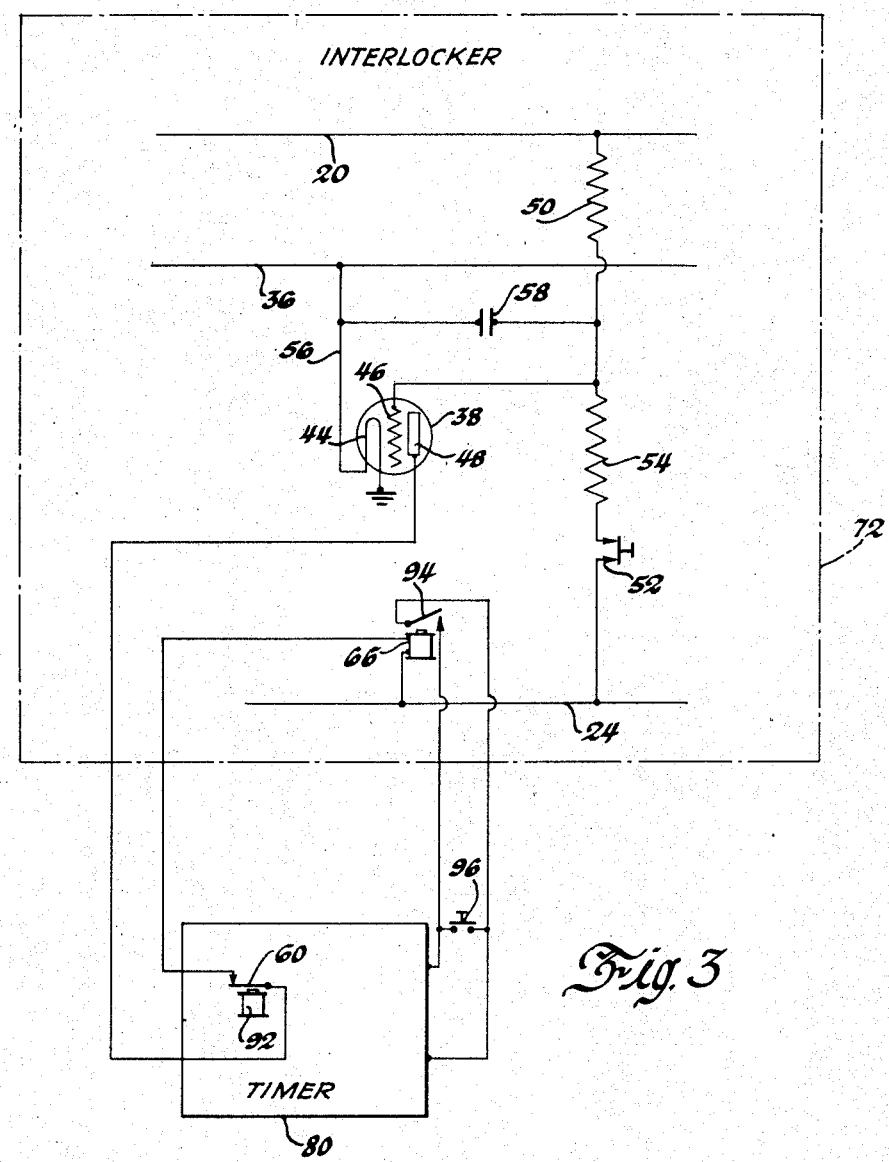

Patented Apr. 6, 1943

2,315,958

UNITED STATES PATENT OFFICE 2,315,958

CONTROL SYSTEM

Frank E. Hill, Detroit, and Francis G. da Roza, Ferndale, Mich., assignors to General Motors Corporation, Detroit, Mich., a corporation of Delaware Application December 22, 1941, Serial No. 423,962

6 Claims. (Cl. 171—97)

This invention relates to control means and more particularly to means for controlling apparatus in which there are a plurality of units intermittently operated and drawing power from the same line or source.

There are many commercial installations in which there are a plurality of units such as motors, etc., that derive their power from the same incoming line or feeder and are operated intermittently. Each of these units may draw a considerable load from a supply line and there will be ample power but if two or more are attempted to be operated simultaneously, then the power supply will not be adequate to properly operate the same. It would not be economically feasible to provide such a large power supply as to carry all or a part of the units if operated simultaneously. A good example of installations in which this problem would arise would be in a plant operating a bank of welding machines, each of which consumes considerable power when operated, but which are not operated continuously but intermittently. It is important to obtain uniform welds and in order to do this a uniform amount of power must be applied each time the machine is operated. Thus, if a welding machine is operated on a given supply line and is regulated to give a satisfactory weld, if another machine is operated simultaneously they will divide the power between them in some manner and therefore the amount of power upon which the first machine was regulated will be reduced and the welds will probably not be satisfactory.

It is therefore an object of our invention to provide means for operating a plurality of similar units on a given power source.

It is a further object of our invention to provide means for operating a plurality of units on a common power source in a manner whereby no two will be operated simultaneously.

It is a still further object of our invention to provide a control system for a plurality of units to prevent more than one unit from operating at a time.

With these and other objects in view which will become apparent as the specification proceeds, the embodiments of our invention will be best understood by reference to the following specification and claims and the illustrations in the accompanying drawings, in which:

As before mentioned, our invention may be applied broadly whenever there are a plurality of operative units supplied from a common power source which is insufficient to supply power for a plurality simultaneously and it is only to illustrate the invention that a welding system has been shown and that this should not be considered in any limiting sense.

Figure 1:
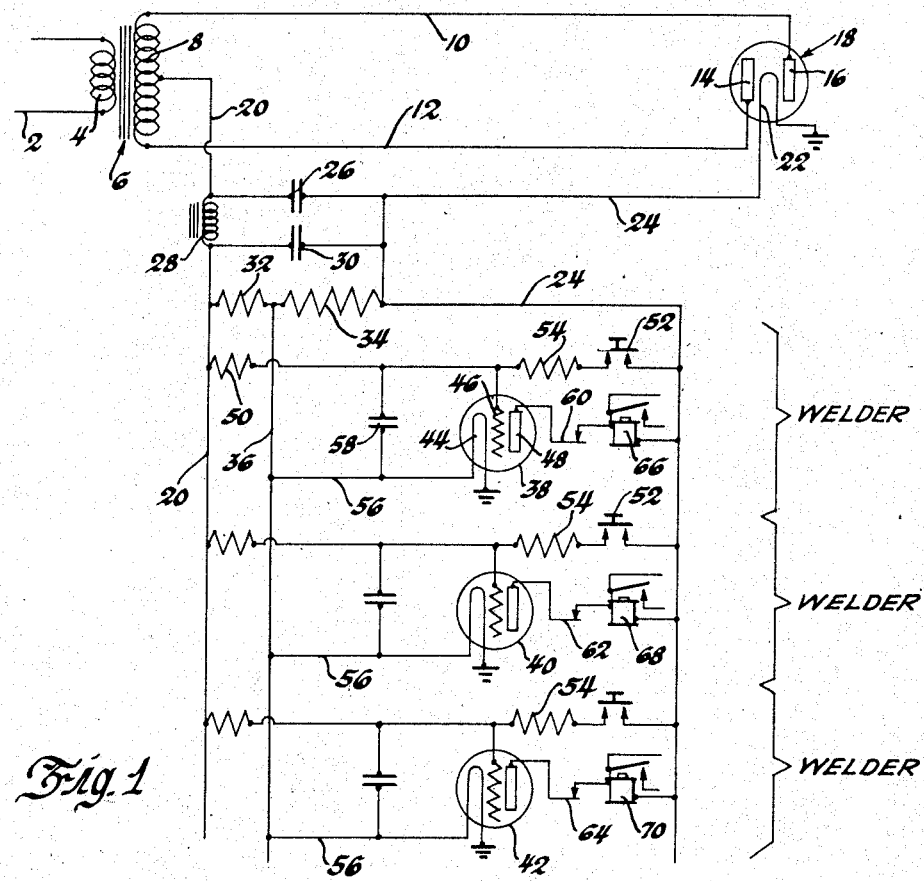
Figure 1 is a circuit diagram of a control system embodying our invention.

Referring now more specifically to the drawings in which like parts are designated in the various figures by the same reference characters, there is shown in Figure 1 an incoming supply line 2 of 110 volts for the control system and this is connected to the primary 4 of a transformer 6, the secondary 8 of which has its two end terminals connected through lines 10 and 12 to electrodes 14 and 16 of a full wave rectifier 18. The center tap of the secondary is connected to line 20. The center electrode 22 of the rectifier 18 is connected to line 24. A filter system is provided which consists of a first condenser 26 connected across the lines 20 and 24, a choke or inductance coil 28 connected in series in the line 20 following the condenser, and there a second condenser 30 which is also across the two lines.

Across the lines 20 and 24 in parallel to the condensers are a pair of resistances 32 and 34 in series. The first of these resistances is a common plate resistance for the control tubes to be described and the second is a bleeder resistance. A line 36 is connected to the juncture of the two resistances.

There are provided a plurality of electron tubes of the thyratron type, one to control each of the welders or other units on the system. In this instance there are three shown as an illustration, though any number may be used. The thyratrons are shown at 38, 40 and 42 and each consists of an envelope and three electrodes, namely, a filament 44, a grid 46, and a plate 48. Connected between each grid and the line 20 is a resistance 50 and connected between the line 24 and each grid is a manually operated push button switch 52 and a resistance 54 in series.

One side of each filament is grounded and the opposite side is connected by a line 56 to line 36. A condenser 58 is connected across the grid and filament circuits. In the plate circuit of each tube is a switch 60, 62 and 64 which switch is mechanically operated by some part in the welder timer mechanism with which it is associated and in series with each switch and between it and line 24 is an operating relay coil 66, 68 and 70. The switches 60, 62 and 64 are normally closed during substantially the whole operating cycle of the timer, but opened at the end of the cycle to cause the thyratron to cease firing.

The relays 66, 68 and 70, which are energized when their associated thyratrons fire, control the switches for the timer which each operates to operate one of the welders. A welder is shown diagrammatically at the right of each tube in Figure 1.

Figure 2:
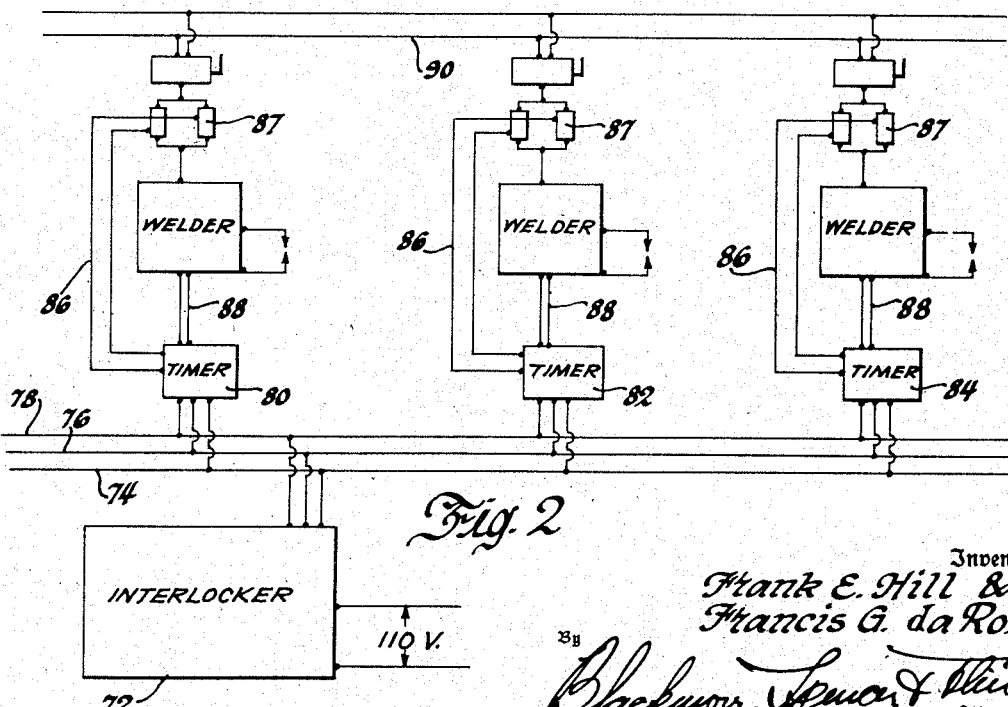
Figure 2 is a circuit diagram illustrating the connections of an entire industrial system; and, Figure 3 is a partial circuit diagram showing more in detail the connections between the interlocking controller and the timer for the welding unit.

Figure 2 shows the whole welding system with three welders shown again as an illustration. The 110 volt supply for the control is shown at 2, the interlock control is here shown by block diagram at 72. This is connected by lines 74, 76, and 78 to each of the timers 80, 82 and 84 which are ordinarily utilized with welding equipment to control the same through the various periods of the weld cycle such as delay, weld, hold and off periods. The timers are each connected by lines 86 to the ignition control tubes 87 and also by lines 88 to the welder. The ignitions are connected between the welding power supply lines 90 which are usually in the order of 440 volts.

Figure 3 shows more specifically the plate circuit of one of the tubes and the connections to the timer. As previously stated, the switch 60 in the plate circuit is normally closed, but is opened for a short interval at a time near the end of the welding cycle by either mechanical or electrical means and in this instance the operating means is shown as a relay 92.

The relay coil 66 in the plate circuit on the other hand operates a switch 94 in parallel with the ordinary push button switch 96 for the timer which would ordinarily be manually depressed to energize the welder if only one were being used on a line instead of a bank of them.

The operation of the system is therefore as follows: one of the operators of a bank of welders desires to make a weld and so depresses the push button 52 of his interlock control. If no other push button 52 is then depressed, this action will close the grid circuit of the associated thyratron tube, reducing the nagtive bias which is ordinarily present when the switch 52 is open to prevent the tube from firing or conducting current. When this bias is thus reduced, the tube will fire and sufficient current will pass through the plate circuit to energize the relay coil 66 which closes the switch 94 and causes the timer 80 to operate through its regular cycle at the end of which relay 92 is energized to break the plate circuit and put the interlocker back in de-energized condition. If any other push button 52 is depressed during this time, its associated timer and welder will not be energized due to the fact that the thyratron tubes are in parallel and when one fires the voltage thereacross drops to a low value, insufficient to cause any of the others to fire. It takes approximately 70 volts to fire a tube and when one is conducting the voltage drop across it is only about 15 volts. Therefore only one tube will be conductive at one time and only one welder or other unit will be operated at one time and a multiplicity of welders or other units may be supplied from one supply with assurance that only one can be energized at a time by this electronic interlocking means and uniform welds are assured or uniform operation of any other type units which it may be desired to control.

We claim:

1. In a control system, a source of power, a multiplicity of units adapted to be connected to the power source for energization, an electronic control for each unit, said electronic means being connected in parallel with each other whereby if one electronic means is conducting the remainder will not be able to conduct due to the drop in voltage across the parallel connection.

2. In a control system, a source of power, a plurality of units adapted to be fed from said power source, switching means for interconnecting each separately to said source, control means for said switching means comprising a plurality of electronic tubes connected in parallel, each controlling the switching means for one unit whereby when any one of the tubes is conducting to energize its associated switching means the remainder of the tubes will remain non-conducting due to the low voltage drop across the parallel circuit.

3. In a control system, a source of power, a plurality of units adapted to be fed from said power source, switching means for interconnecting each separately to said source, control means for said switching means comprising a plurality of electronic tubes connected in parallel, relay means connected to each tube and controlled thereby, said relay means each being connected to a switch means for a single unit whereby when any one tube is energized one unit will be operated, but no other as the voltage across the parallel supply for the tubes will be reduced below the initial operating voltage.

4. In a control system, a source of power of relatively high voltage, a plurality of power consuming units, switching means for connecting each of the units separately to the source of power, a plurality of electronic control tubes normally biased to non-conducting state connected in parallel, a relatively low voltage supply therefor, relay means connected to each tube and to a single switching means for controlling a single unit and means to reduce the bias on any one tube to cause the same to become conductive, reducing the voltage thereacross to energize its relay and unit whereby no other unit may be energized as the voltage drop across the parallel supply for the tubes will fall on operation of one to such a low point that no other can become conductive until the first ceases and the voltage returns to its initial value.

5. In a control system, a source of power, a plurality of power consuming units, switching means for connecting each of the units separately to the source of power, a control means comprising a plurality of electronic multi-electrode tubes having filaments, grids and plates, the filaments and plates of all tubes being connected in parallel, a bias voltage applied to the grids to control the conductivity of the tubes, and relay means in each plate circuit to control the switching means for one unit whereby as the bias of a tube is varied the relay means will control the energization of the associated unit but no other tube may become conductive as the voltage drop on the parallel circuit decreases to such a point as to be insufficient to fire the tube and therefore only one unit at a time may operate.

6. In a control system, a source of power, a plurality of units to be supplied therefrom and to operate intermittently, switching means to control the connection of the units to the source of power, and control means for the switching means comprising a plurality of gaseous electronic tubes connected in parallel, each tube connected to and controlling the switching means for one of the units in which the voltage drop across the tube during its conductive period is only a small part of that required to make it initially become conductive whereby only one tube may conduct at a time and only one unit may operate at one time.

FRANK E. HILL.
FRANCIS G. DA ROZA.